United States Patent [19]

Cresap et al.

[11] 4,333,021
[45] Jun. 1, 1982

[54] TRANSIENT STABILITY ENHANCEMENT OF ELECTRIC POWER GENERATING SYSTEMS BY 120-DEGREE PHASE ROTATION

[75] Inventors: Richard L. Cresap; Carson W. Taylor; Michael J. Kreipe, all of Portland, Oreg.

[73] Assignee: The United States of America as represented by the United States Department of Energy, Washington, D.C.

[21] Appl. No.: 148,863

[22] Filed: May 12, 1980

[51] Int. Cl.³ .............................. H02J 1/00; H02J 3/00
[52] U.S. Cl. ........................................ 307/87; 307/127
[58] Field of Search ...................... 307/84, 85, 86, 87, 307/127

[56] References Cited

U.S. PATENT DOCUMENTS

| | | | |
|---|---|---|---|
| 3,559,042 | 1/1971 | Gingell | 307/127 |
| 3,586,871 | 6/1971 | Seidel | 307/87 |
| 3,740,572 | 6/1973 | Cohn | 307/87 |
| 4,021,704 | 5/1977 | Norbeck | 307/127 |

OTHER PUBLICATIONS

"Transient Stability Enhancement by 120-Degree Phase Rotation" IEEE Winter Power Meeting, Dec. 1979.
"Improvement of Power System Transient Stability by Phase-Shift Insertion" Proc. IEEE vol. 120 No. 2.

*Primary Examiner*—Russell E. Adams
*Attorney, Agent, or Firm*—Richard E. Constant; Richard G. Besha; James E. Denny

[57] ABSTRACT

A method and system for enhancing the transient stability of an intertied three-phase electric power generating system. A set of power exporting generators (10) is connected to a set of power importing generators (20). When a transient cannot be controlled by conventional stability controls, and imminent loss of synchronism is detected (such as when the equivalent rotor angle difference between the two generator sets exceeds a predetermined value, such as 150 degrees), the intertie is disconnected by circuit breakers. Then a switch (30) having a 120-degree phase rotation, or a circuit breaker having a 120-degree phase rotation is placed in the intertie. The intertie is then reconnected. This results in a 120-degree reduction in the equivalent rotor angle difference between the two generator sets, making the system more stable and allowing more time for the conventional controls to stabilize the transient.

12 Claims, 8 Drawing Figures

TRANSIENT STABILITY ENHANCEMENT OF ELECTRIC POWER GENERATING SYSTEMS BY 120-DEGREE PHASE ROTATION

The U.S. Government has rights in this invention.

BACKGROUND OF THE INVENTION

The present invention relates generally to the stability of electric power generating systems and more particularly to a method for enhancing the transient stability of two intertied sets of three phase generators by 120-degree phase rotation.

Electric power generating systems usually consist of at least two intertied sets of three-phase generators. An example would be a remotely-located single generator set sending power over an intertie to a distant multi-generator set. Another example would be the generators in the Pacific Northwest connected to the generators in California by the Pacific Intertie. An intertie consists of at least one and preferably two or more circuits. Each circuit consists of three wires, one wire for each of the three phases of the AC current.

When one generator set has an excess of power over local load, and a second generator set has a deficiency of power over local load, the excess power can be sent over the intertie from the first to the second set. The first generator set can be thought of as synchronously turning the power deficient generators in the second set. Because of inertia-type factors, the generators in the second set lag behind those in the first set. Equivalently, the power exporting first generator set can be said to lead the power importing second generating set. This lead can be expressed as the "equivalent rotor angle difference." Since exported power can be measured by conventional means, and it is well known to be proportional to the trigonometric sine function of the equivalent rotor angle difference, the latter can be computed by those skilled in the art from the formula: $P = EV \sin G/X$ where X is the reactance of the intertie, E is the voltage at the first generator set end of the intertie, and V is the voltage at the second generator set end of the intertie. E, V, and X can be measured by conventional techniques. G is the equivalent rotor angle difference.

The value of the equivalent rotor angle difference is an indication of the stability of the system. Theoretically a system would be unstable, in the sense that synchronism is lost, if the equivalent rotor angle difference would never reach a stationary value. In practice, the system would be considered unstable when the exported power falls to some unacceptably low level after peaking, reflecting, through the previous equation, the increase in the equivalent rotor angle difference to some value past 90 degrees. The unacceptably low level of exported power could be subjectively chosen as some percentage of the maximum or peak power that could be delivered. Maximum power occurs when the equivalent rotor angle difference is 90 degrees. An unstable equivalent rotor angle difference, through the previous equation, could then be determined which can be considered as indicating imminent loss of synchronism. When this point is reached, the power company will disconnect the intertie, and there will be a power loss in the area served by the power importing second generator set. A power company might decide to disconnect the intertie before the previously determined equivalent rotor angle difference is reached if, for example, the rate of increase in that angle is excessively large. Power companies routinely determine, in accordance with the prior art, at what point they will disconnect an intertie due to imminent loss of synchronism.

Factors causing instability in a power system that previously has been operating satisfactorily are called transients. A voltage or current transient will either die out or cause the system to go unstable. The transients can be caused, for example, by a fault in the line, such as would occur when a power line transmission tower, carrying one circuit of the intertie, is knocked to the ground by high winds. This "shorted" line has dropped the electric load of the importing second generator set. This causes the exporting first generator set to speed up rotation due to the imbalance between its unchanged mechanical input and its dropped electrical load. With a double circuit intertie, power would be switched to the still standing second circuit. However, it is a question whether or not the transient can be stabilized. If the increasing equivalent rotor angle difference can't be controlled, the power company must disconnect the second and final circuit of the double circuit intertie, resulting in power loss to the importing area.

Conventional techniques known to those skilled in the art, for enhancing the transient stability of a power system include: series capacitor compensation of lines, dynamic brakes, fast valving, high-speed excitation systems, and generator and load tripping. Sometimes these controls fail to stabilize the transients.

Phase-shifting transformers can be used to improve power system transient stability, as disclosed by D. O'Kelly and G. Musgrave in "Improvement of power-system transient stability by phase-shift insertion," *Proceedings of the Institute of Electrical Engineers* (Proc. IEE), Volume 120, No. 2, pages 247–252, February 1973. In that article, when the equivalent rotor angle difference (which they call effective rotor angle) reaches 120 degrees (or 90 degrees), a transformer is inserted in the intertie to add a lag of 52, 60, or 40 degrees to the system. This decreases the equivalent rotor angle difference (which they call phase shifting) by 52, 60, or 40 degrees. The decreased equivalent rotor angle difference will tend to increase again, but this gives more time for the conventional stability controls to bring the system under control before synchronism is lost.

Use of a transformer to decrease the equivalent rotor angle is expensive, costing between 35 and 50 million dollars (assuming a rate of about $20 per kilowatt).

The maximum phase shift of the transformer, as discussed in the article, is 60 degrees. The article suggests that 30 or 40 degrees is more feasible. Insertion of a phase-shifting transformer puts mechanical stress on the generators, especially on the generator shafts. In the article, with a maximum 60 degrees phase shift available, a power company will have to switch in the transformer at a certain point in time. If a greater phase shift were available, then the decision to insert it could be delayed. This would allow more time for the conventional transient stability controls to stabilize the system, resulting in fewer transformer insertions and hence less damage to generator shafts. A generator shaft could cost about $50 million dollars to replace. Also, the maximum 60-degree phase shift of the prior art's transformer may not be sufficient, in some instances, to allow the conventional controls to stabilize the system.

SUMMARY OF THE INVENTION

It is an object of the invention to enhance the transient stability of two intertied three-phase electric power generator sets. It is a second object of the invention to delay loss of synchronism between two generator sets to allow more time for conventional transient stability controls to stabilize the power system. It is another object of the invention to enhance transient stability only after conventional controls have been employed for as long as possible. It is an added object of the invention to enhance transient stability by a large decrease in the equivalent rotor angle diference between two generator sets. It is a further object of the invention to enhance transient stability at an economical cost.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method of this invention for helping the transient stability of two interconnected synchronous three-phase electric power generator sets, one driving the other, may comprise the following steps. First determine when the two generator sets are about to go out of step. Then break the interconnection between the two sets. Then take the original connections of the alternating current's three phases which link the two generator sets and change them such that each phase originating from the driving generator set is now connected to the phase terminating at the driven generator set which lags it by 120 degrees. Reestablish the interconnection between the two generator sets.

A system of this invention for helping the transient stability of two interconnected synchronous three-phase electric power generator sets, one set driving the other, may comprise the following parts. Means are provided for determining when the two generator sets are about to go out of step. Means are provided for breaking and reestablishing the interconnection between the two sets and changing the original connections of the three phases linking the two generator sets such that each phase originating from the driving generator set is now connected to the phase terminating at the driven generator set which lags it by 120 degrees.

An alternate system of this invention may comprise the following parts. Means are provided for determining when the two generator sets are about to go out of step. Means are provided for breaking the interconnection between the two sets. Means are provided (in parallel with the breaking means) for reestablishing the interconnection between the two sets and changing the original connections of the three phases linking the two generator sets such that each phase originating from the driving generator set is now connected to the phase terminating at the driven generator set which lags it by 120 degrees.

Another alternate system of this invention may comprise the following parts. Means are provided for determining when the two generator sets are about to go out of step. Means are provided for breaking and reestablishing the interconnection between the two sets. Means are provided (in series with the breaking and reestablishing means) for changing the original connections of the three phases linking the two generator sets such that each phase originating from the driving generator set is now connected to the phase terminating at the driven generator set which lags it by 120 degrees.

The benefits and advantages derived from the invention include an economical method and system for improving the transient stability of intertied three-phase electric power generators by an economical 120-degree phase rotation. The invention is applied only after conventional stability controls prove inadequate. The invention provides additional time before loss of synchronism is again reached for those conventional controls to stabilize the system. Additional phase rotations of 120 degrees each are provided for when needed. The prior art achieved a maximum 60-degree phase shift by use of a transformer. The present invention achieves a 120 degree phase rotation by use of a switch or a circuit breaker to rotate the phase connections between the two generator sets. The invention costs less than the transformer of the prior art. The invention can be inserted in the system at a later time during a transient than can the transformer of the prior art.

BRIEF DESCRIPTION OF THE DRAWINGS

The accompanying drawings, which are incorporated in and form a part of the specification, illustrate several embodiments of the present invention and, together with a description, serve to explain the principles of the invention. In the drawings.

DETAILED DESCRIPTION OF THE INVENTION

Figure 1:
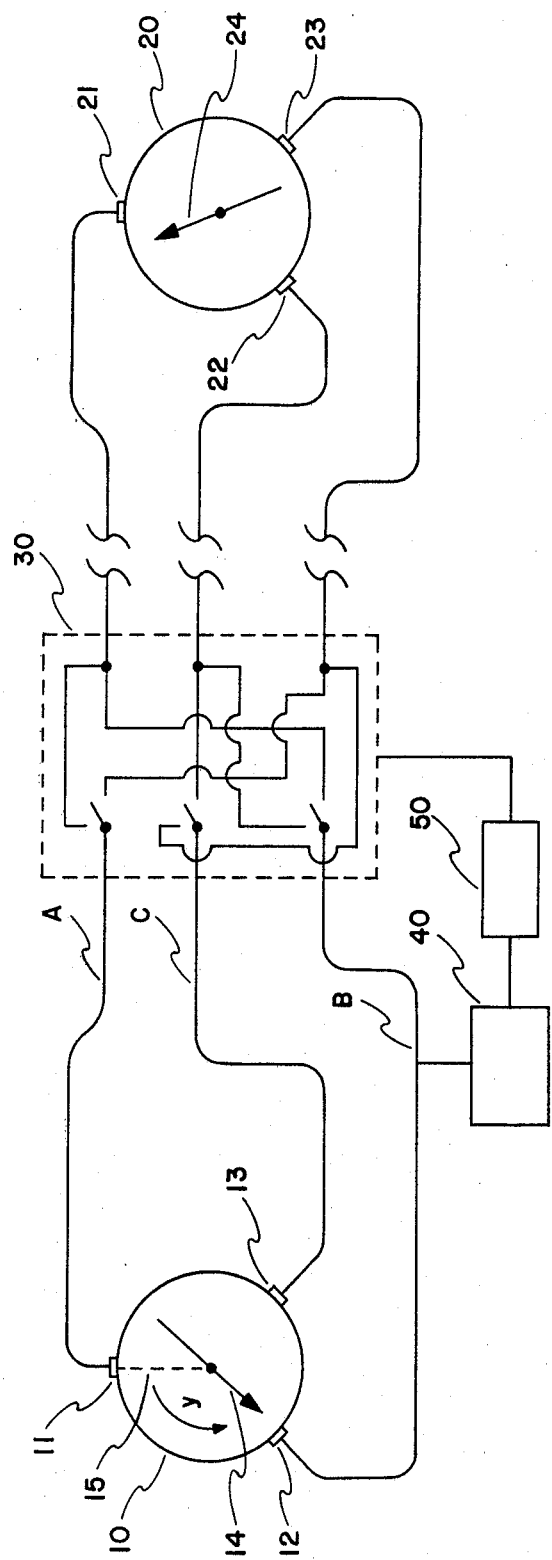
FIG. 1 is a schematic diagram of an electric power generating system having 120-degree phase rotation capability.

In FIG. 1, for purpose of illustration, an electric power generating system is shown having a first set of three-phase generators 10, consisting of a single generator, synchronously turing an intertied second set of three-phase generators 20, consisting of a single generator. The power exporting generator 10 sends power, while the power importing generator 20 receives power. The exporting generator 10 could stand for an equivalent power exporting generator composed of a set of many three-phase generators. Similarly, the importing power generator 20 can stand for an equivalent generator consisting of a set of many three phase generators.

The power exporting generator 10 has a rotor 14 which turns counter-clockwise. The exporting generator 10 produces alternating current. One node 11 on the exporting generator 10 is the pick up point for one phase of the alternating current. The wire attached to this node 11 is defined to carry the A phase current. In like manner, a second node 12 on the exporting generator 10 is the pick up point for the second phase of the alternating current, and the wire connected to this node 12 is defined to carry the B phase of the current. Finally, a third node 13 on the exporting generator 10 is the pick up point for the third and final phase of the alternating current, and the wire attached to this node 13 is defined to carry the C phase of the three phase alternating current. The rotor 14 is seen to turn past the nodes in the following sequence: first node 11, second node 12, and third node 13. The three nodes are 120 degrees apart, and the alternating current of phases A, B, and C are 120 degrees apart in phase. A dashed imaginary reference line 15 has been drawn from the center of the turning rotor 14 to the first or A phase node 11. The rotor angle Y is defined as the angle of the rotor 14 from the reference line 15.

The wires carrying the A, B, and C phases of the alternating currents are inputs to the left-hand side of the switch 30. The three output wires on the right-hand side of the switch 30 are connected to the power importing generator 20. Usually, the importing generator 20 is located many miles from the switch 30, while the power exporting generator 10 is located relatively close to the switch 30.

The power importing generator 20 has a rotor 24 which also turns counter-clockwise. One node 21 of this generator 20 receives one wire from the switch 30, a second node 22 receives the second wire, and the third node 23 receives the third wire from the switch 30. The rotor 24 turns past the nodes in the sequence: first node 21, second node 22, and third node 23.

The wire from the first node 12 on the power exporting generator 10 carrying the B phase is also seen connected to means 40 for detecting loss of synchronism. Detecting means 40 could just as easily have been connected to the A or C phase of the current. Detecting means 40 could also be connected to two or three of the electric current phases. Detecting means 40 is seen connected to means 50 for activating switch which is connected to the switch 30. The switch 30 provides sub-switches for each of the three phases. The subswitch for each phase has three positions. One position is the disconnect position in which no current flows from the exporting generator 10 to the importing generator 20. The second position is the normal or initial phase connection position. The third position is the 120-degree phase rotation position.

Figure 2:
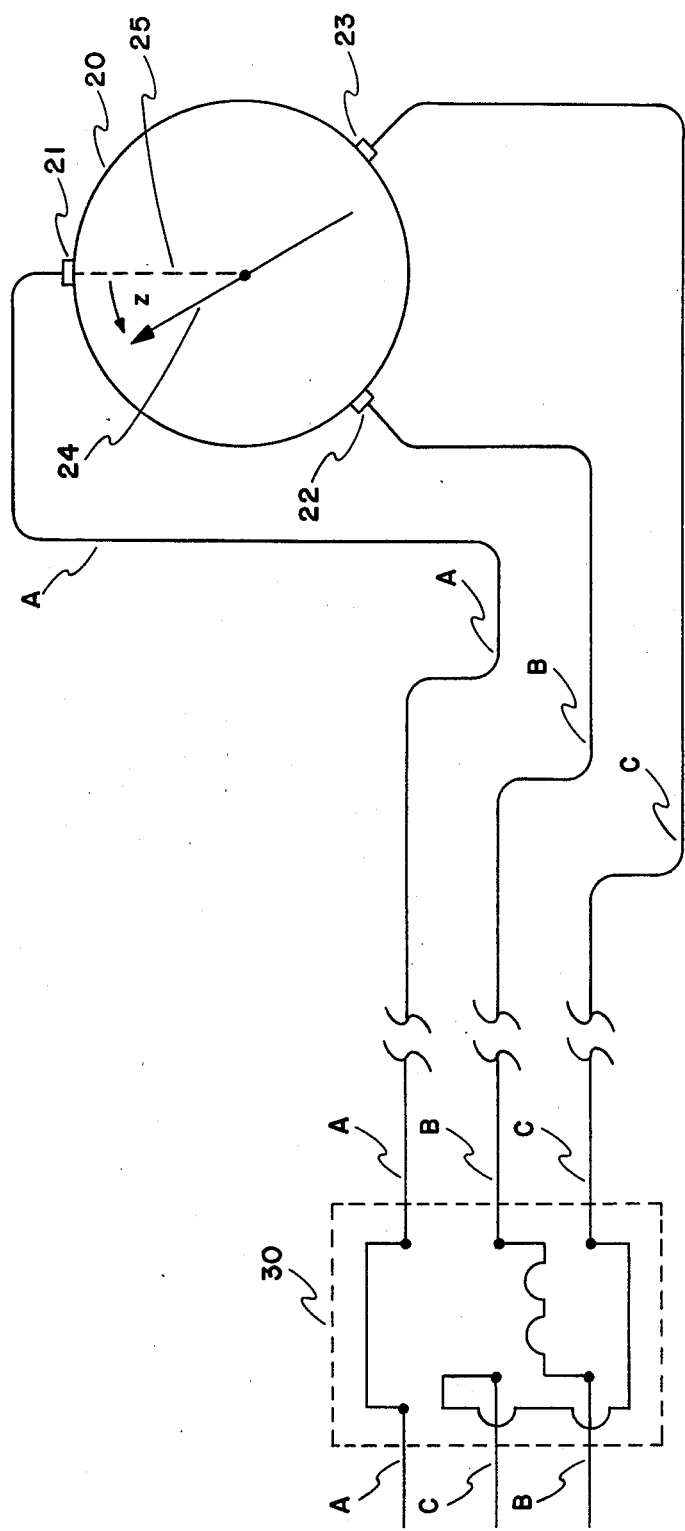
FIG. 2 is a schematic diagram of the switch, showing the initial phase connections, and the power receiving generator, showing the rotor angle, of FIG. 1.

FIG. 2 depicts the switch 30 and the power receiving generator 20 with the switch 30 in the initial phase connection position. In this position the A phase current from the first node 11 of the exporting generator 10 is seen to be connected to the first node 21 of the importing generator 20. The B phase current of the second node 12 of the exporting generator 10 is seen to be connected to the second node 22 of the power receiving generator 20. The C phase current from the third node 13 of the exporting generator 10 is seen to be connected to the third node 23 of the power importing generator 20. As the rotor angle Y of the rotor 14 of the exporting generator 10 was seen to be measured from the reference line 15 to the A phase node 11 of the exporting generator generator 10, in like manner, the rotor angle Z of the rotor 24 of the importing generator 20 is to be measured from the reference line 25 which is drawn from the center of the rotor 24 to the A phase node 21 of the receiving generator 20. The equivalent rotor angle difference G is defined to by angle Y minus angle Z. The term "equivalent" is used because the exporting generator 10 can represent the equivalent generator of a set of many three phase power exporting generators, and the importing generator 20 can represent an equivalent generator for a set of many power importing generators.

Figure 3:
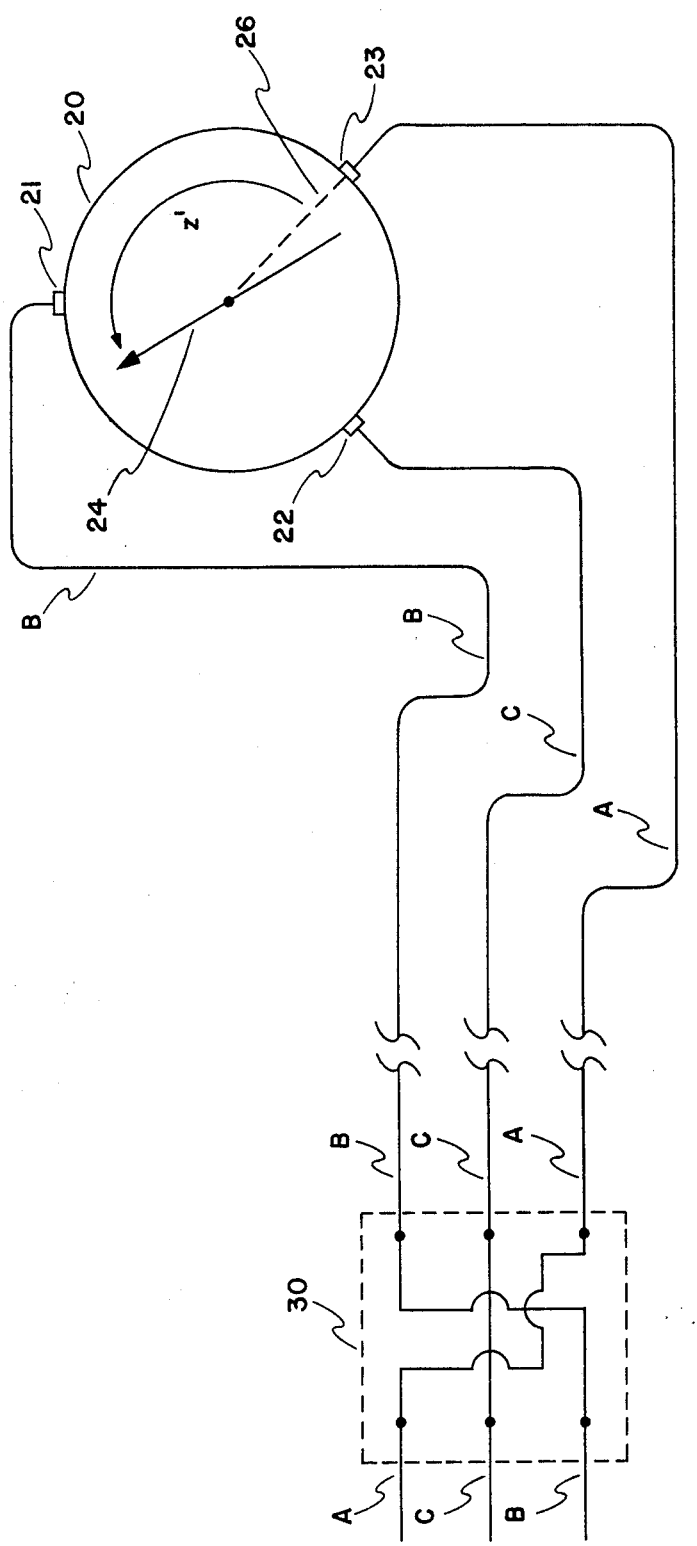
FIG. 3 is a schematic diagram of the switch, with 120-degree phase rotation, and the power receiving generator, showing the rotor angle, of FIG. 1.

FIG. 3 shows the switch 30 and the power receiving generator 20 when the switch 30 is in the 120-degree phase rotation position. Here, it is seen that the B phase of the current is connected to the first node 21, the C phase to the second node 22, and the A phase to the third node 23 of the importing generator 20. The rotor 24 still turns past the nodes in the sequence: phase A, phase B, and phase C. The rotor 24 in FIG. 3 points in the same direction as it does in FIG. 2. FIG. 3 therefor depicts the conditions of FIG. 2 the instant the switch 30 is changed from its initial phase connection position to the 120-degree phase rotation position. In FIG. 3, the angle of the rotor 24 must still be measured from the A phase node, which in this case is the third node 23. The reference line 26 is drawn from the center of the rotor 24 to the third node 23. The rotor angle Z' is the angle of the rotor 24 measured from the reference line 26. To those skilled in the art, it is easily seen that the rotor angle Z' is equal to rotor angle Z plus 120 degrees. Since the equivalent rotor angle difference of the system with the switch 30 in the initial phase connection position was angle Y minus angle Z, the equivalent rotor angle difference of the system with the switch 30 in the 120-degree phase rotation position is seen to be angle Y minus angle Z' which is equivalent to angle Y minus angle Z minus 120 degrees. It is seen that the effect of the switch 30 is to reduce the equivalent rotor angle difference G between the two generator sets by 120 degrees.

Figure 4:
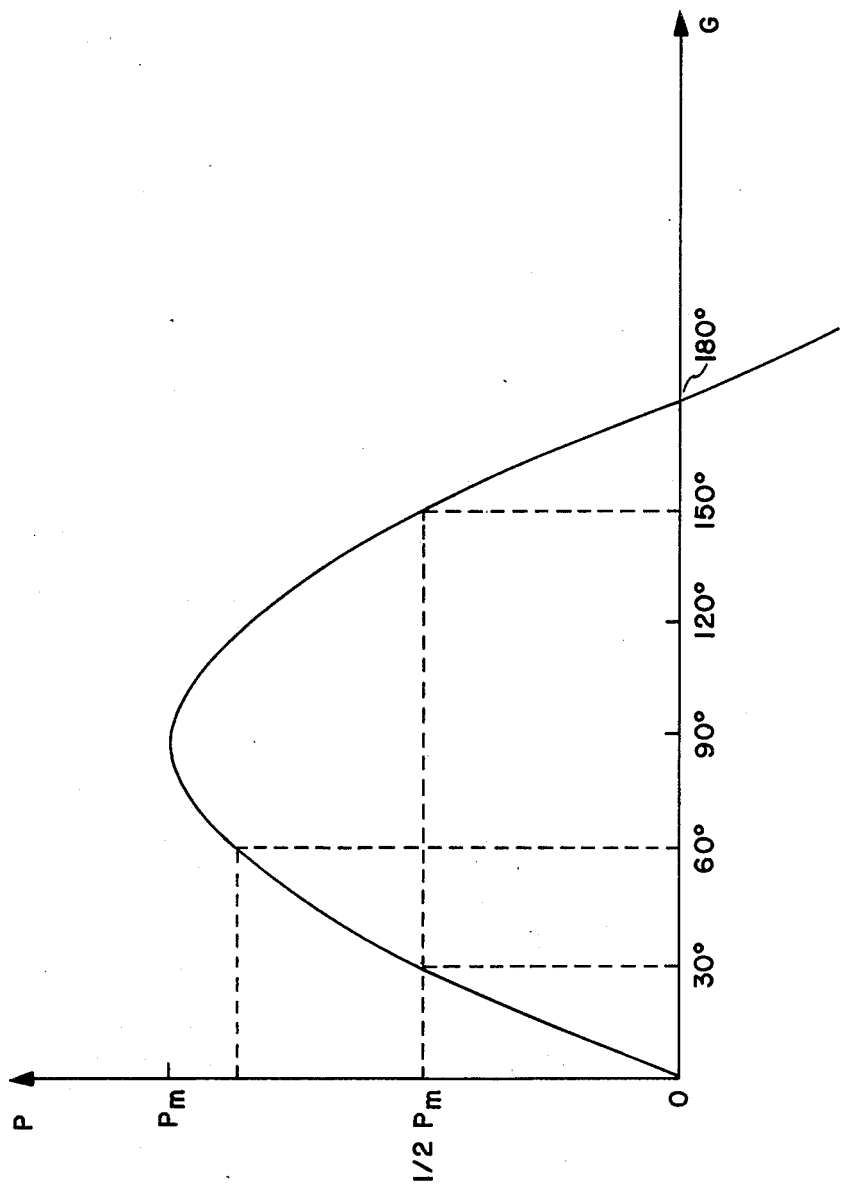
FIG. 4 is a graph of the electric power, of the power sending generator of FIG. 1, showing its dependence on the equivalent rotor angle difference.

The phase connections between the two generator sets is rotated by 120 degrees by the switch 30 when imminent loss of synchronism is detected between the two generator sets. Means are provided for detecting the imminent loss of synchronism, as shown in FIG. 1. Preferably, such means includes measurement of the equivalent rotor angle difference G. It could also include measurement of the rate of change of this quantity. As is well known to those skilled in the art, the power sent by the exporting generator 10 is proportional to the trigonometric sine function of the equivalent rotor angle difference. This is depicted in FIG. 4 where G, the abscissa of the graph, is the equivalent rotor angle difference, and P is the power generated by the B phase of the current from the exporting generator 10. The maximum power is $P_M$ which is reached when G is 90 degrees. Half of the maximum power is seen to occur when G is 30 or 150 degrees. Conventional techniques would be used for measuring the power and calculating the maximum power. A typical electric power generating system would normally operate at an equivalent rotor angle difference G of 60 degrees. A predetermined value may be chosen for the equivalent rotor angle difference to define the imminent loss of synchronism between the two generator sets. The power in FIG. 4 is not the instantaneous power but an average power.

The exporting electric power generator 10 uses conventional stability controls to minimize the effects of transients on the line. However, sometimes these controls are not able to stabilize the system in the time it takes to lose synchronism. As an example, suppose a system normally operating with an equivalent rotor angle difference of 60 degrees. Assume that imminent loss of synchronism is defined to occur when the equivalent rotor angle difference reaches 180 degrees. Further assume that a transient caused by a three-phase fault has occurred in the power system causing the equivalent rotor angle difference G to increase from its normal 60 degree value. The conventional stability controls of the exporting generator 10 would work to try to stabilize the system. Also assume that these conventional controls are able to slow down the transient, but that angle G still will pass 180 degrees. The power system must disconnect the intertie connecting the power sending and power receiving generators if there is imminent loss of synchronism. This could lead to a blackout in the area served by the importing generator 20 from the exported power of the sending generator 10. The invention provides that when the measured power goes to zero (which occurs when the equivalent rotor angle difference goes to 180 degrees), a switch activator would change the connections on the switch 30 from the initial phase connection position to the 120-degree phase rotation position. As discussed previously, this decreases the equivalent rotor angle difference G by 120 degrees. The system would now have an angle G of 60 degrees, which has been defined to be its normal operating equivalent rotor angle difference. Because of the transient, after the phase rotation, the quantity G would still increase but the conventional stability controls would continue to operate. In many instances the conventional controls would now stabilize the system and bring it back to an angle G of 60 degrees. If the conventional controls fail to do this, another 120-degree phase rotation could easily be installed in the system using this invention, by those skilled in the art, to gain even more time for the conventional controls to take hold. Consecutive 120-degree phase rotations could be applied to gain as much time as desired. In another example, imminent loss of synchronism can be defined as an angle G of 150 degrees. If angle G reaches that value, the 120-degree phase rotation would switch angle G to 30 degrees. This is less than the normal operating value of 60 degrees. However, the conventional controls would work to stabilize not only a greater value of angle G than the normal value of 60 degrees, but also a lower value.

Imminent loss of synchronism could be defined in another example as 120 degrees. The choice of a value for angle G to define imminent loss of synchronism may depend upon the dynamics and time delays of the specific system in question. For example, in the time it takes to rotate the phases by 120 degrees, angle G might increase by 20 degrees. Thus, if you desire to rotate phases when angle G is 150 degrees, instead of getting a new value of angle G of 30 degrees, you would get one of 50 degrees due to the "20 degree" time delay in switching. More elaborate means for detecting imminent loss of synchronism might include calculation of the rate of increase of angle G. The rate could be calculated, for example, from the formula: rate$=(G_2-G_1)/(t_2-t_1)$, where $G_2$ is the value of angle G at time $t_2$ and $G_1$ is the value of angle G at earlier time $t_1$. Thus, even if angle G reached a low value (say 90 degrees), if its rate of increase were large (say 10 degrees in a 60th of a second), loss of synchronism may be defined to exist at those conditions.

As previously mentioned, an electric power generating system may have its stability disturbed by transients. A transient may be caused by a three phase fault in the line. FIGS. 1 through 3 showed the invention employed in an electric power generating system to handle transients. FIGS. 5 through 8 show the invention used in an electric power generating system to handle transients and also show how the fault is cleared. In FIGS. 5 through 8, each single line represents three wires carrying the three phases of alternating current. Thus, these figures are single line diagrams depicting the three phases. Whereas FIGS. 1 through 3 showed a single three phase interconnection or intertie between the two generator sets, FIGS. 5 through 8 employ a double circuit intertie, with each circuit consisting of three phase wires. These figures show various switching arrangements using 120-degree phase rotation.

Figure 5:
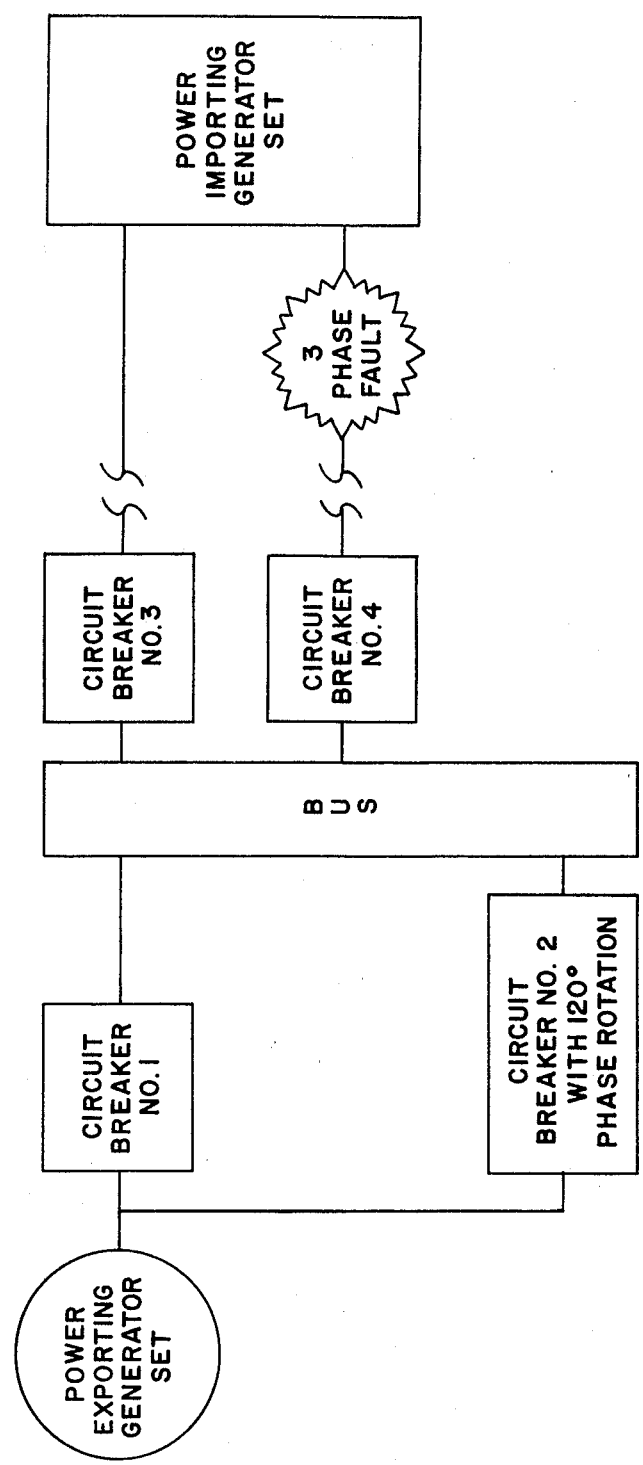
FIGS. 5 through 8 are single line schematic diagrams of alternative 120-degree phase rotation switch and circuit breaker configurations.

In FIG. 5, electricity normally flows from the power exporting generator set to the power importing generator set through circuit breaker number 1 to the bus and then through circuit breaker number 3 and circuit breaker number 4 along the double circuit intertie. Circuit breaker number 2 is normally in the open position. Suppose a three-phase fault occurs on the intertie circuit containing circuit breaker number 4 between it and the power importing generator set. For example, the three-phase fault may occur due to a dropped line caused by high winds. When this condition is sensed by conventional means, the fault will be cleared by opening circuit breaker number 4. Electricity now flows from the power exporting generator set to the power importing generating set through circuit breaker number 1 to the bus and then through circuit breaker number 3. However, assume that during the existence of the fault, transients occurred on the line which have not yet been controlled by the conventional stability controls of the power exporting generator set. When imminent loss of synchronism is detected, circuit breaker number 1 will open. After insuring that circuit breaker number 1 is indeed open, circuit breaker number 2 is closed with 120-degree phase rotation. Circuit breaker number 2 remains closed until the normal connection is restored. Electricity now flows from the power exporting generator set to the power importing generator set through circuit breaker number 2 to the bus and then through circuit breaker number 3. Return to normal connection could be accomplished during the next unit outage or possibly by reducing load, rejecting load, and then rapidly resynchronizing with a normal connection.

Figure 6:
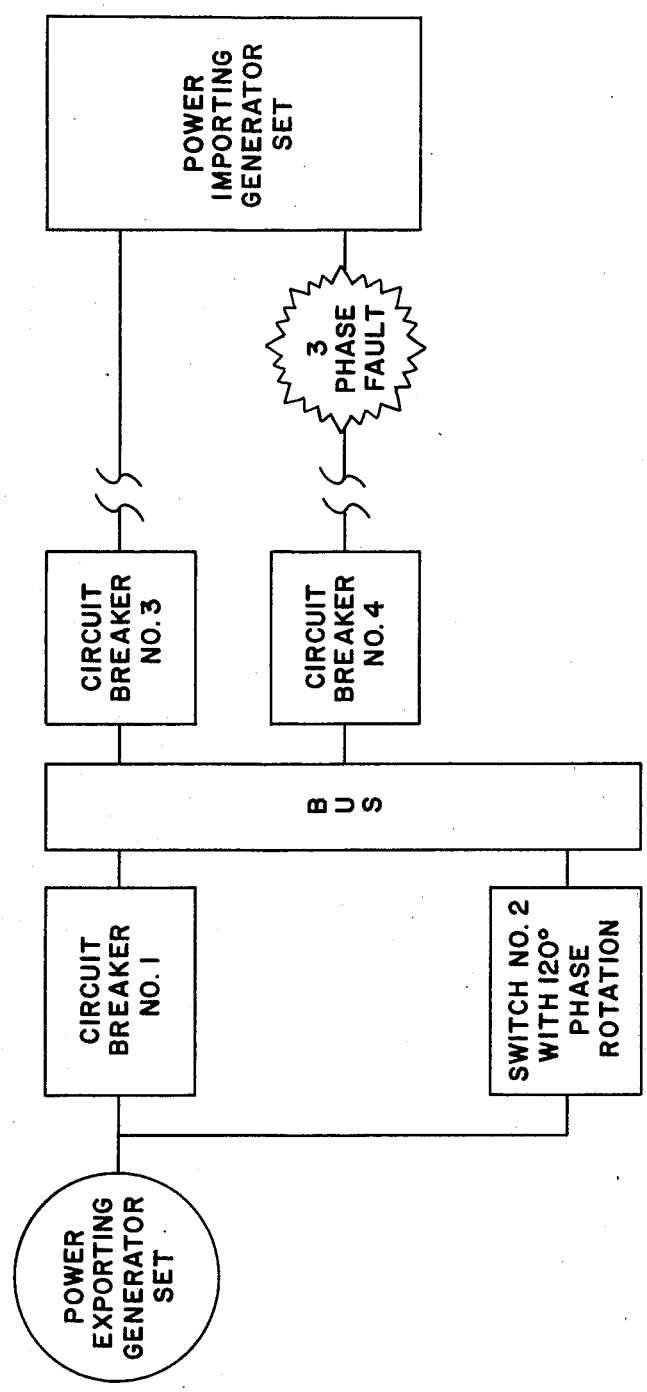

FIG. 6 is similar to FIG. 5 except that circuit breaker number 2 is replaced with fast closing, 120-degree phase rotating switch number 1. This has the advantage of being a quite low cost stability control. If the closing time of switch number 2 is the same as circuit breaker number 2 of FIG. 5, the stability effectiveness would be indentical. Circuit breaker number 4 would remain open to clear the fault. The remaining line circuit breaker number 3 could opened with circuit breaker number 1 and be closed with switch number 2 to allow sharing of switching duty.

Figure 7:
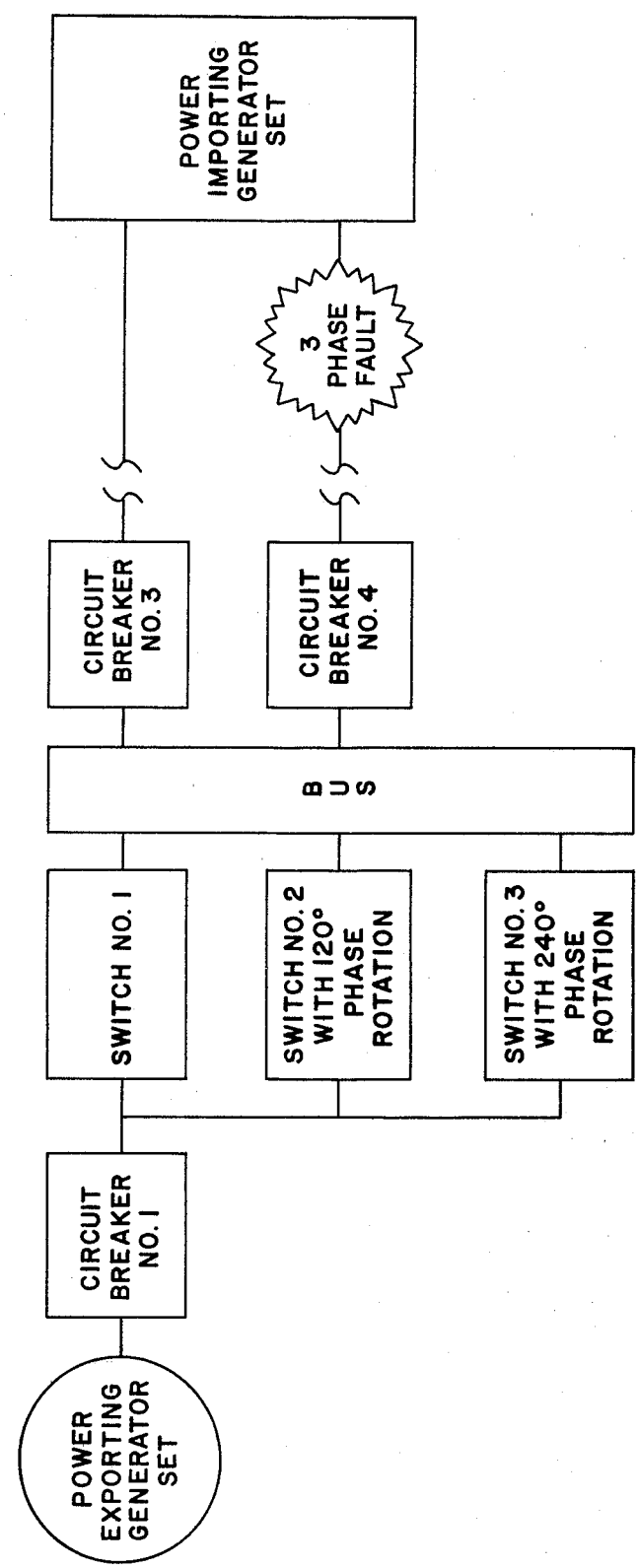

FIG. 7 shows two additional possibilities with switches in series rather than in parallel with a unit circuit breaker. Again, this is much lower in cost than FIG. 5 since an additional circuit breaker is not required. Circuit breaker number 4 would be left open in clearing the three-phase fault. Electricity would flow between the generator sets through circuit breaker number 1, switch number 1, the bus, and circuit breaker number 3. When imminent loss of synchronism (out of step condition) is detected, circuit breaker number 1 would be opened, then switch number 1 would be opened, then switch number 2 with 120-degree phase rotation would be closed, and finally circuit breaker number 1 would be reclosed. Opening and reclosing the remaining line circuit breaker number 3 in addition to circuit breaker number 1 would allow sharing of the out of step tripping duty and allow simultaneous operation of the switches. The switch duty would be minimal since the bus would be completely deenergized. Switch number 3 involves a second rotation (240 degrees total). With three switches, no connection need be considered "normal" and, following a phase rotation event, the switch would be left closed until the next event. At that time, switching would result in another 120-degree rotation in angle A.

Figure 8:
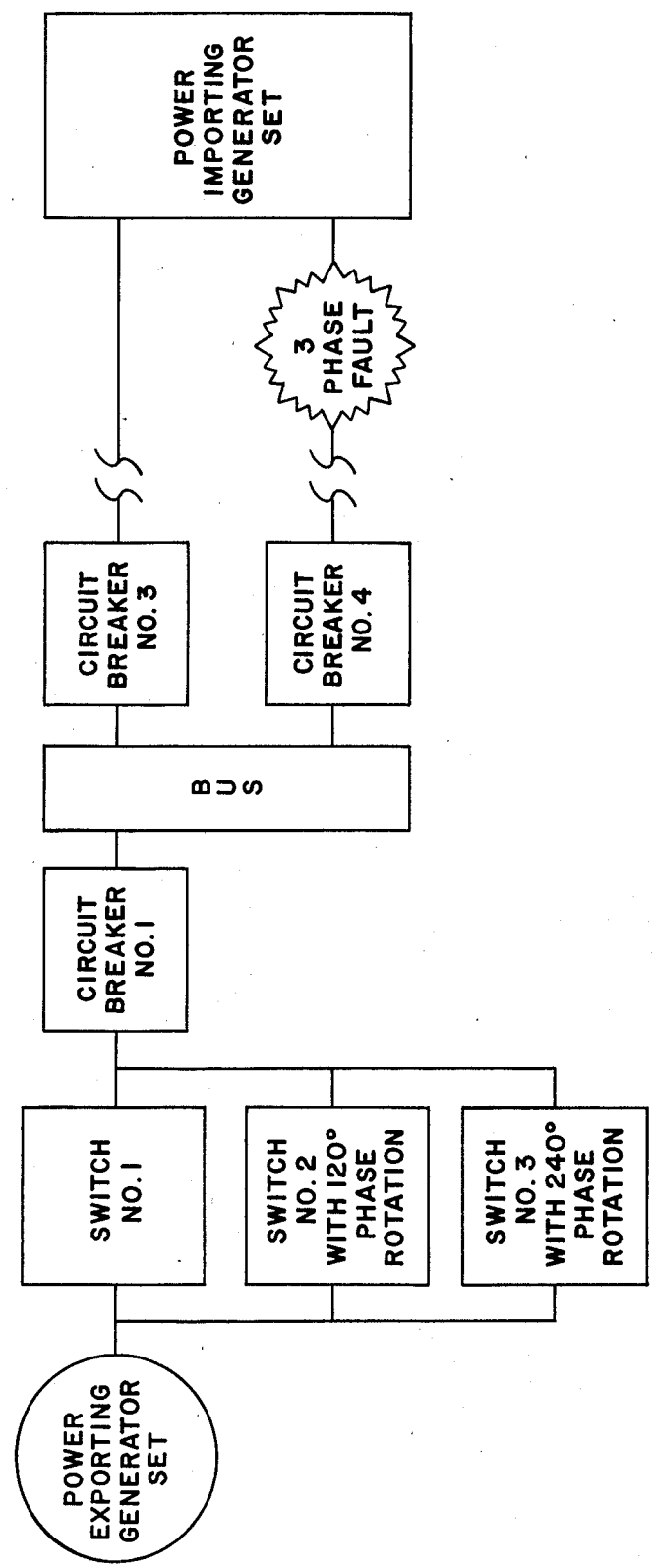

FIG. 8 shows a variation of FIG. 7 with the switches being placed on the power exporting generator set side of circuit breaker number 1. This may have some protective relaying advantages.

In one example of the invention, means are provided for detecting the imminent loss of synchronism between the two generator sets. Preferably, such means includes calculation of the equivalent rotor angle difference G to see if it has reached a predetermined value (such as 150 degrees), to define imminent loss of synchronism. Angle G could be calculated through the previously given formula relating it to the measured power. In accordance with the invention, means are provided for disconnecting the intertie between the two generator sets when imminent loss of synchronism is detected. Preferably, such means includes a circuit breaker. In accordance with the invention, means are provided for reconnecting the two generator sets and rotating the phase connection between the generator sets by 120 degrees, thereby reducing the equivalent rotor angle difference by 120 degrees. Preferably, such means includes a circuit breaker with 120-degree phase rotation. Alternately, such means includes a switch with 120-degree phase rotation.

A complete cycle of operation of the previously described example of the invention begins with detecting the imminent loss of synchronism between the two generator sets. This normally is done by calculating when the equivalent rotor angle difference exceeds a predetermined value (such as 150 degrees). Then the intertie between the two generators sets is disconnected, usually by the use of a circuit breaker. Then the phase connection between the two generator sets are rotated by 120 degrees from the initial phase connection to reduce the equivalent rotor angle difference between the sets by 120-degrees. This is usually done by a circuit breaker having 120 degree phase rotation or a switch having 120-degree phase rotation. Finally the intertie between the two generators sets is reestablished. Normally, the reconnection is accomplished by the circuit breaker or switch having the 120-degree phase rotation. The two generator sets are now connected with the new phase connection.

The prior art makes use of a 30 to 60 degree phase shifting transformer while the present invention makes use of a 120-degree phase rotating switch or circuit breaker. Thus, the invention results in a larger reduction in the equivalent rotor angle difference than does the prior art transformer. The invention therefor can wait longer before it is needed than can the transformer. This allows conventional controls more time to stabilize the system, and the intertie may not have to be disconnected. Fewer disconnections and reconnections of the intertie will result in less stress placed upon generator shafts, which are expensive to replace. Also, when the invention's 120-degree phase rotation is accomplished, the conventional controls have more time to stabilize the system before synchronism is again lost than with the 30 to 60 degree phase shifting transformer of the prior art. Furthermore, the invention can allow repeated 120-degree phase rotations to give even more time for the conventional controls to act. Another improvement of the invention over the prior art is that the cost of switches and circuit breakers with 120-degree phase rotation is less than the cost of a transformer.

The invention uses a switch or circuit breaker with 120-degree phase rotation to reduce the equivalent rotor angle difference between two intertied three-phase generator sets by 120 degrees. The relatively inexpensive technique of the invention allows a relatively large phase shift, and is applied to the system when loss of synchronism is imminent to give the conventional controls more time to stabilize the transient.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for enhancing the transient stability of an electric power generating system having a first set of three-phase generators synchronously turning an intertied second set of three-phase generators at an initial phase connection and an equivalent rotor angle difference, comprising:
   a. detecting the imminent loss of synchronism between the two generator sets;
   b. disconnecting the intertie between the first and second sets when said imminent loss of synchronism is detected;
   c. rotating the phase connections 120 degrees between said first and second sets from said initial phase connection, when said intertie is disconnected, to reduce the equivalent rotor angle difference between the sets by 120 degrees; and
   d. reconnecting the two generator sets at said new phase connection.

2. The method as defined by claim 1, wherein:
   a. said detecting is carried out by measuring the equivalent rotor angle difference between the said first and second generator sets; and
   b. said disconnecting is carried out when said equivalent rotor angle difference reaches about 150 degrees.

3. The method as defined by claim 1, wherein said step of reconnecting is carried out concurrently with said step of rotating.

4. The method as defined by claim 1, wherein said step of reconnecting is carried out after said step of rotating.

5. A system for enhancing the transient stability of an electric power generating system having a first set of three-phase generators synchronously turning an intertied second set of three-phase generators at an initial phase connection and an equivalent rotor angle difference, comprising:
  a. means for detecting the imminent loss of synchronism between the two generator sets; and
  b. means for disconnecting and reconnecting the intertie between said first and second sets and rotating the phase connections 120 degrees between said first and second sets from said initial phase connection to reduce the equivalent rotor angle difference between the sets by 120 degrees.

6. The system as defined by claim 5, wherein said means for disconnecting, reconnecting, and rotating comprises a switch having a 120-degree rotated phase connection.

7. A system for ehancing the transient stability of an electric power generating system having a first set of three-phase generators synchronously turning an intertied second set of three-phase generators at an initial phase connection and an equivalent rotor angle difference, comprising:
  a. means for detecting the imminent loss of synchronism between the two generator sets;
  b. means for disconnecting the intertie between said first and second sets; and
  c. means, in parallel with said disconnecting means, for reconnecting the two generator sets and rotating the phase connections 120 degrees between said first and second sets from said initial phase connection to reduce the equivalent rotor angle difference between the sets by 120 degrees.

8. The system as defined by claim 7, wherein said means for reconnecting and rotating comprises a switch having a 120-degree rotated phase connection.

9. The system as defined by claim 7, wherein said means for reconnecting and rotating comprises a circuit breaker having a 120-degree rotated phase connection.

10. A system for enhancing the transient stability of an electric power generating system having a first set of three-phase generators synchronously turning an intertied second set of three-phase generators at an initial phase connection and an equivalent rotor angle difference, comprising:
  a. means for detecting the imminent loss of synchronism between the two generator sets;
  b. means for disconnecting and reconnecting the intertie between said first and second sets; and
  c. means, in series with said disconnecting and reconnecting means, for rotating the phase connections 120 degrees between said first and second sets from said initial phase connection to reduce the equivalent rotor angle difference between the sets by 120 degrees.

11. The system as defined by claim 10, wherein said means for rotating comprises a circuit breaker having a 120-degree rotated phase connection.

12. The system as defined by claim 5, 7, or 10, wherein said means for detecting comprises means for calculating the equivalent rotor angle difference between the generator sets.

* * * * *